United States Patent [19]
Ma et al.

[11] Patent Number: 5,825,409
[45] Date of Patent: Oct. 20, 1998

[54] FLEXIBLE DISK MODE OBSERVER

[75] Inventors: Yiping Ma; David E. Jones, both of Layton, Utah

[73] Assignee: Iomega Corporation, Roy, Utah

[21] Appl. No.: 977,181

[22] Filed: Nov. 24, 1997

Related U.S. Application Data

[63] Continuation of Ser. No. 555,483, Nov. 8, 1995, abandoned.

[51] Int. Cl.$^6$ ........................................................ H04N 7/18
[52] U.S. Cl. .............................. 348/88; 348/95; 348/130; 356/426
[58] Field of Search ...................................... 356/394, 426; 369/53; 324/212; 382/141; 348/61, 88, 86, 87, 92, 93, 94, 95, 125, 126, 129, 131, 135, 136, 137, 130

[56] References Cited

U.S. PATENT DOCUMENTS

| | | | |
|---|---|---|---|
| 4,030,835 | 6/1977 | Firester et al. | 356/426 |
| 4,868,683 | 9/1989 | Schulz | 348/95 |
| 5,142,588 | 8/1992 | Sogabe et al. | 348/88 |
| 5,377,002 | 12/1994 | Malin et al. | 356/426 |
| 5,579,113 | 11/1996 | Papst et al. | 356/426 |

OTHER PUBLICATIONS

Adams, G., "Critical Speeds for a Flexible Spinning Disk", *International J. of Mechanical Sciences* 1987, vol. 29, No. 8, pp. 525–531.
Adams, G. "Analysis of the Flexible disk–Head Interface", *J. of Lubrication Technology* 1980, vol. 102(1), pp. 86–90.
Benson R.C. and Bogy, "Deflection of a Very Flexible Spinning Disk Due to a Stationary Transverse Load", *ASME Journal of Applied Mechanics*, vol. 45, No. 3, pp.636–642, 1978.
Benson, R.C., "Observations on the Steady–State Solution of an Extremely Flexible Spinning Disk with a Transverse Load", *ASME Journal of Applied Mechanics* 1983, vol. 50, No. 3, pp. 525–530.
Carpino, M. et al., "Investigation of a Flexible Disk Rotating Near a Rigid Surface", *J. of Tribology*, 1988, 110(4), 664–669.
Greenberg, H.J., "Flexible Disk–Read/Write Head Interface", *IEEE Transactions on Magnetics* 1978, 14(5), 336–338.
Kitagawa, K. et al., "Head–to–Disk Interface in a Rapidly Rotating Flexible Disk Using Flying Heads", *Tribology and Mechanics of Magnetic Storage Systems* 1990, Bhushan, B. and Eise, Jr., eds., STLE Park Ridge, IL, SP–29, pp. 49–54.
Lamb, H. and Southwell, "The Vibration of a Spinning Disk", *Proceedings of Royal Society of London*, Series A, vol. 99, pp. 272–280, 1921.
Ono, K. and Maeno, "Theoretical and Experimental Investigation on Dynamics Characteristics of a 3.5 Inch Flexible Disk Due to a Point Contact Head", *Tribology and Mechanics of Magnetic Storage Systems*, 1986. Bhushan, B. and Eise, Jr., eds., STLE Park Ridge, IL, SP–21, pp. 144–151.
Southwell, R.V., "On the Free Transverse Vibrations of a Uniform Circular Disc Clamped at its Centre; and On the Effects of Rotation", *Proceedings of Royal Society of London*, Series A, vol. 101, pp. 133–153, 1921.
Copy of International Search Report issued in PCT/US96/17021 dated Dec. 27, 1996.

*Primary Examiner*—Amelia Au
*Attorney, Agent, or Firm*—Woodcock Washburn Kurtz Mackiewicz & Norris LLP

[57] ABSTRACT

System and method for determining displacement or alteration of flexible media under different operating conditions. The system includes a reference pattern which is projected onto the surface of the flexible media. The modes of displacement can then be visualized by viewing the reference pattern reflected from the surface of the flexible media.

27 Claims, 3 Drawing Sheets

FLEXIBLE DISK MODE OBSERVER

This is a continuation of application Ser. No. 08/555,483, filed Nov. 8, 1995, now abandoned.

BACKGROUND OF THE INVENTION

1. Field of the Invention

The present invention is related to a method and system for visualizing dynamics of a flexible media or disk rotating between two stationary plates under the load of suspended heads, in particular, disk motion and formation of standing waves are visualized.

2. Description of the Prior Art

Magnetic recording on flexible disks has been mostly limited to products that have low performance, low capacity and poor reliability, such as the standard 5.25 inch floppy drive and the 3.5 inch floppy drive. Both have capacity in the range of a few megabytes and average latency of more than 50 milliseconds. One of the limiting factors to obtaining higher performance is the complicated disk dynamics associated with a floppy disk at high rotational speed. The only commercially available high capacity and high performance disk drive products using flexible disks are drives where the flexible disk is rotated next to a stationary plate. Tight manufacturing tolerances and specially designed recording heads, however, make these drives quite expensive. "Head Load/Unload and Cleaning in a Data Storage Device," Ser. No. 324,895, filed Oct. 18, 1994, Bracken et al. (Attorney's Docket No. IOM-8771) and related applications show a disk drive with a cartridge having a flexible media having high performance. Further, "Flexible Disk Cartridge," Ser. No. 324,572, filed Oct. 18, 1994, Ma et al. (Attorney's Docket No. IOM-8774), shows a disk cartridge having means for inducing and substantially maintaining a predetermined standing wave pattern, or mode, in a flexible recording disk rotating at high speeds. The application is incorporated by reference for its teachings on standing waves or modes of flexible media.

To improve flexible media performance, the media dynamics must be determined. Known methods and systems for measuring flexible media dynamics, however, have been mostly analytical and based on ideal conditions due to the complexity of the dynamics. For example, some previous methods monitor the free vibration of rotating disks, see, for example, Lamb, H. and Southwell, R. V., 1921, "The Vibration of a Spinning Disk," *Proceedings of Royal Society of London*, Series A. Vol. 99, pp. 272–280 and Southwell, R. V., 1921, "On the Free transverse Vibrations of a Uniform Circular Disc Clamped at its Centre; and One the Effects of Rotation," *Proceedings of Royal Society of London*, Series A, Vol. 101, pp. 133–153.

More recent methods evaluate the vibration of a free spinning disk under the loading of a fixed point source, see, for example, Benson, R. C. and Bogy, D. B., 1978, "Deflection of a Very Flexible Spinning Disk Due to a Stationary Transverse Load," ASME *Journal of Applied Mechanics*, Vol. 45, No. 3, pp. 636–642, Benson, R. C., 1983, "Observations on the Steady-State Solution of an Extremely Flexible Spinning Disk with a Transverse Load," ASME *Journal of Applied Mechanics*, Vol. 50, No. 3, pp. 525–530, and Ono, K. and Maeno, T., 1986, "Theoretical and Experimental Investigation on Dynamic Characteristics of a 3.5 inch Flexible Disk Due to a Point Contact Head," *Tribology and Mechanics of Magnetic Storage Systems*, Bhushan, B. and Eiss, Jr., N. A., ed., STLE Park Ridge, IL, AP-21, pp. 144–151. The importance of the disk bending stiffness for analysis was identified. A term called 35 foundation stiffness was later introduced to include the effect of a plate next to which the disk was rotated, see, Adams, G. G., 1987, "Critical Speeds for a Flexible Spinning Disk," *International Journal of Mechanical Sciences*, Vol. 29, No. 8, pp. 525–531.

Some methods also attempt to evaluate the mechanical interface between the recording head and flexible disk, see Adams, G. G., 1980, "Analysis of the Flexible disk/Head Interface," *Journal of Lubrication Technology*, Vol. 102, No. 1, pp. 86–90 and Greenberg, H. J., 1978, "Flexible disk-Read/Write Head Interface," IEEE *Transactions on Magnetics*, Vol 14, No. 5, pp. 336–338. These methods are mostly restricted to a fixed spherical head. The complicated nonlinear disk dynamics at high rotational rates, however, make complete analysis very difficult, thus, an empirical method of evaluation is necessary.

One previous empirical method, using a 3.5 inch disk, concentrates mostly on disk stabilization in the absence of the external head loading, see Kitagawa, K., Ohashi, H., and Imamura, M., 1990, "Head-to-Disk Interface in a Rapidly Rotating Flexible Disk Using Flying Heads," *Tribology and Mechanics of Magnetic Storage Systems*, Bhushan, B., and Eiss, Jr., N. S., ed., STLE Park Ridge, IL, SP-29, pp. 49–54. When the heads were loaded on the disk, however, this method only evaluated the very limited case of where the heads were fixed in radial position and penetration.

In addition, existing visualization methods use photonic sensors (see Ono and Maeno, 1986) and an optical scanning system (see Carpino, M. and Domoto, G. A., 1988, "Investigation of a Flexible Disk Rotating near a Rigid Surface," *Journal of Tribology*, Vol. 110, No. 4. pp. 664–669). These methods are inadequate, however, because they take a significant amount of time to characterize a whole disk. Moreover, the close operating proximity of the photonic sensor employed in these methods to the disk influences the disk motion. As a consequence, a system and method that allows better visualization of the disk mode shapes while not influencing the disk mode shapes are needed.

SUMMARY OF THE INVENTION

The present invention is directed to a system and method for observing modes of an optically exposed rotating flexible media. The system includes a transparent sheet having a reference pattern disposed thereon. The transparent sheet is located above the optically exposed rotating flexible media and the reference pattern is aligned with a center of the optically exposed rotating flexible media. In addition, a camera is located above the transparent sheet. In operation, the camera receives the reference pattern reflecting off a surface of the optically exposed rotating flexible media. The recorded reflected reference pattern indicates the modes of the optically exposed rotating flexible media.

Ideally, the reference pattern is a plurality of concentric circles having centers aligned with the center of the optically exposed rotating flexible media. Further, at least one of the plurality of concentric circles is a dashed line.

The system may also include a light diffuser attached to the transparent sheet and located between the transparent sheet and the camera. In addition, a light source may be located between the camera and the light diffuser. The light source and light diffuser work in combination to generate a uniform illumination across the surface of the flexible media and the transparent sheet.

For a user of the system to observe what the camera is receiving, a monitor may be operatively coupled to the camera for viewing the image reflected from the surface of the flexible media. In addition, a video cassette recorder may be operatively coupled to the camera for recording the image reflected from the surface of the flexible media. Also, a video printer may be operatively coupled to the camera for printing the image reflected from the surface of the flexible media.

BRIEF DESCRIPTION OF THE DRAWINGS

The above and other aspects and advantages of the invention will become more apparent from the following detailed description of the presently preferred exemplary embodiment of the invention taken in conjunction with the accompanying drawings, of which.

DETAILED DESCRIPTION OF PREFERRED EMBODIMENTS

Figure 1:
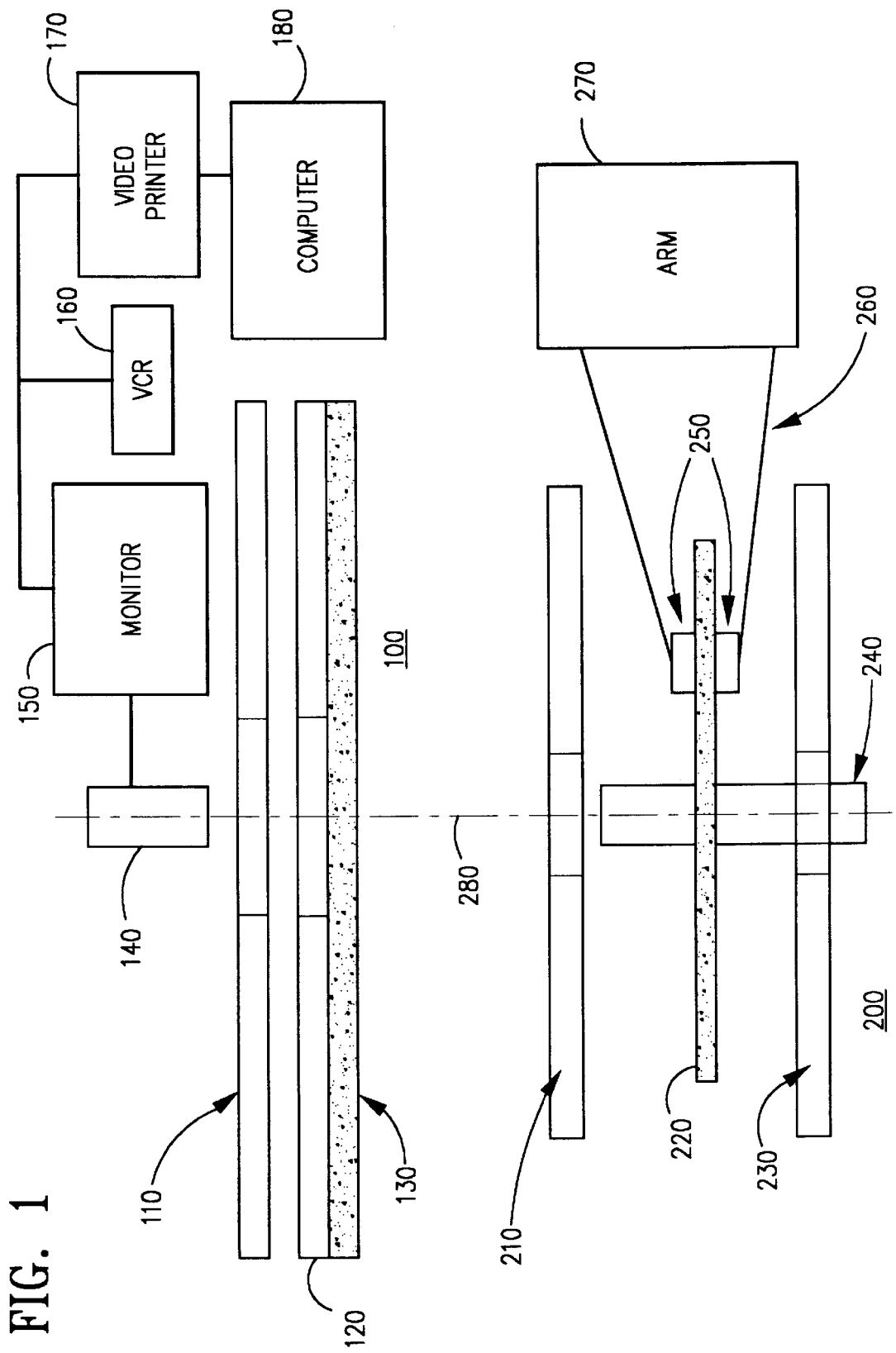
FIG. 1 is a block diagram of a flexible media mode observation system analyzing a flexible media system in accordance with the present invention.

FIG. 1 depicts a block diagram of a flexible media mode observation system 100 in accordance with the present invention analyzing a flexible media system 200. The observation system includes a light source 110, a light diffuser 120, a reference target 130, a video camera 140, a monitor 150, a video cassette recorder ("VCR") 160, a video printer 170, and a computer 180. The flexible media system 200 includes a clear top plate 210, a flexible media (disk) 220, a base plate 230, a spindle 240, and read/write heads 250 attached to a rotary actuator arm 270 by suspensions 260.

In the flexible media system 200, the spindle 240 is attached to a spin stand with a variable speed motor controller (not shown). The clear top plate 210 and base plate 230 simulate the cartridge housing of a media system, i.e., the effect of the cartridge housing on the flexible media 220 during operation (rotation at operational speeds). In one configuration of the media system, the heads 250 are a pair of 50% Winchester heads mounted on the suspensions 260. The suspensions 260 are attached to the rotary actuator arm 270 which is mounted on a stage (not shown) that is capable of moving along the spin axis 280 (vertical axis) of the flexible media system 200.

As shown in FIG. 1, the video camera 140 is aligned with the center of the motor spindle (spin axis 280) and leveled with the motor datum surface of the flexible media 220. The light source 110 and light diffuser 120 are located between the camera 140 and the clear top plate 210 of the media system 200. The light source 110 provides light energy which the light diffuser 120 absorbs and emits to generate uniform illumination over the spin stand.

The reference target 130 is a transparent sheet made from transparency film. In the exemplary embodiment, the film is attached to the light diffuser 120 and, thus, located between the light diffuser 120 and the clear top plate 210 of the media system 200. The uniform illumination generated by the combination of the light source 110 and light diffuser 120 passes through the target 130 and the clear top plate 210 onto the highly reflective surface of the flexible media 220. The transparent sheet of the target has a reference pattern or target pattern printed on its surface. As a consequence, the pattern of the reference target 130 is reflected onto the highly reflective surface of the flexible media 220.

The highly reflective surface of the flexible media 220 reflects the reference pattern of the reference target 130 back up through holes in the center of the reference target, light diffuser 120 and light source 110 onto the lens of the camera 140. The camera 140 receives and collects the pattern of the reference target 130 reflected off the surface of the flexible media 220. As the flexible media 220 is rotated and undergoes deformation due to the complex dynamics of the media 220, the surface of the flexible media 220 is also deformed, which, in turn, deforms or alters the pattern of the reference target projected onto and reflected off the surface of the flexible media 220. Any distortion in the reflected image (pattern) indicates a deflection of the flexible media 220 from its nominal plane which is parallel to the reference target plane. The deformation or alternation of the reference pattern, thus, represents the empirical changes of the flexible media 220 during loading of the heads 250 and rotation of the flexible media 220.

As noted above, the camera 140 receives the reference pattern reflected off the flexible media 220. The camera 140 converts the light energy of the reflected pattern into an electrical signal representative of the received pattern. The electrical signal is provided to the monitor 150, VCR 160, and video printer 170. The monitor 150 permits a viewer/user to observe alterations of the reference pattern during real time testing/operation of media system 200. The VCR 160 records the output of the camera 140 for future viewing and evaluation. The video printer 170 generates hard copies (snapshots) of the reflected reference pattern and may also convert the electrical signal into a digital signal for further evaluation by the computer 180. The computer may store digital snapshots of the reflected reference pattern and provide the ability to analyze the reflected pattern more vigorously.

It has been found that the particular reference pattern selected to be projected onto the surface of the flexible media 220 affects the ability to measure/determine alterations of the flexible media 220. In particular, a circular pattern opaquely printed on the film of the reference target is ideal for detecting alterations of the surface of the rotating flexible media 220. The circular pattern enables the observation of standing wave formations. The circular pattern includes a plurality of concentric circles (rings) having 25 different diameters and a common center which is aligned with the spindle center 280 of the media system 200. FIGS. 2a to 3c represent printed reflected patterns of flexible media system 200 under different operational conditions. It has also been found that a parallel line pattern offers good visualization of media initial or static waviness.

The flexible media system 200 used to generate the reflected patterns shown in these Figures was a standard 3.5 inch floppy with a clamping diameter of 29 mm. The flexible media 220 was composed of a 63.5 micron thick mylar base film with 0.7 micron thick metal particle magnetic recording coating on both sides. The flexible media 220 was rotated in the middle of a pair of flat plates (210 and 230) with a radial cut out for head access. The plates are spaced 1.2 mm apart. The relatively large plate separation was chosen so that even with large head to disk misalignment the disk (media) would not come into contact with the plates when the heads were loaded on the disk.

Figure 2A:
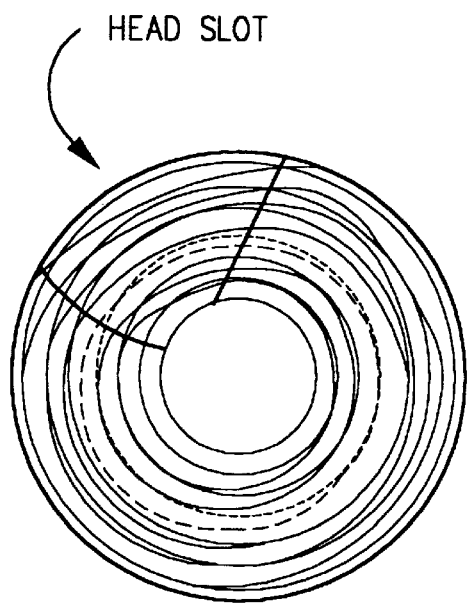
FIGS. 2a–3c are prints of images generated by the flexible media system shown in FIG. 1.
Figure 2B:
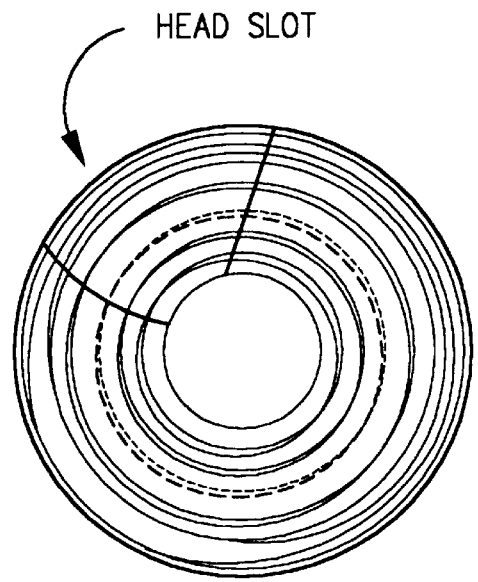
Figure 2C:
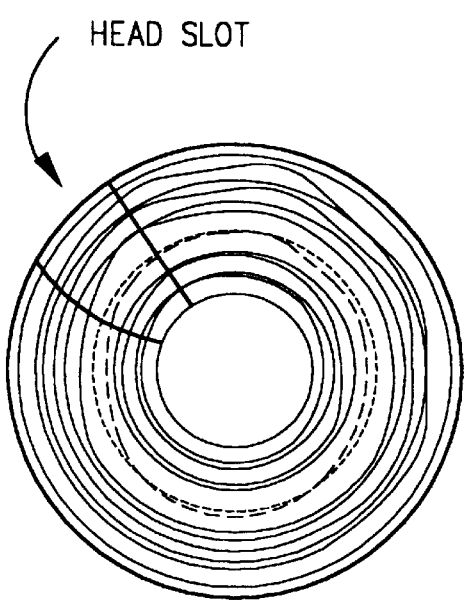
Figure 2D:
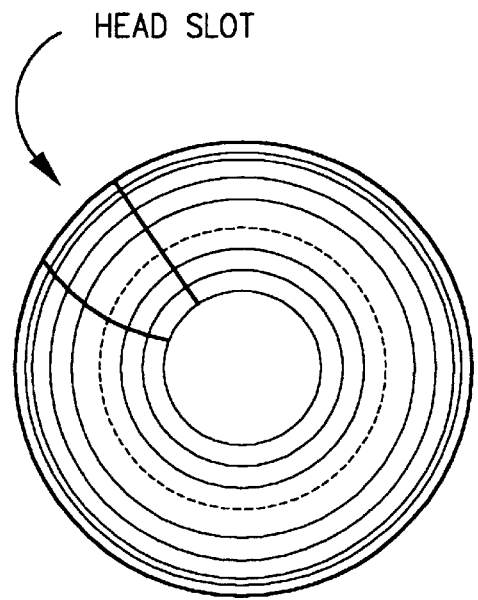

In FIGS. 2a, 2c, and 3a–3c, the flexible media 220 was rotated at 3000 revolutions per minute ("rpm") . In FIGS. 2b and 2d, the flexible media 220 was rotated at 4500 rpm. As noted above, the top plate 210 is made of clear plastic to allow observation of the whole disk (media) 220. The reflection off this clear plastic plate offers a visual reference of how an undistorted disk would appear. The distance between the two reflected images (one from the media and the other from the top of the clear plastic top) indicates the slope of the deformed disk at a point. To further facilitate this quantification, one of the rings of the reference pattern is a dashed line. Two different shapes of head access slot were used to generate the reflectance patterns shown in FIGS. 2a–3c (as denoted in the Figures by the radial lines and marked "HEAD SLOT").

As shown in FIGS. 2a, 2b, and 3a–3c, one head slot had a large pie-shaped section cut out to facilitate the use of a rotary actuator configured with a Head/Suspension Assembly (HSA) (250 and 260) mounted in line with the actuator arm (270). The other slot as shown in FIGS. 2c–2d was much smaller but similarly shaped. This slot configuration, however, required the HSA to be mounted at a 90 degree angle relative to the actuator arm, a configuration commonly referred to as a "dog leg". Both slots allowed the use of industry standard rotary actuators.

Figure 3A:
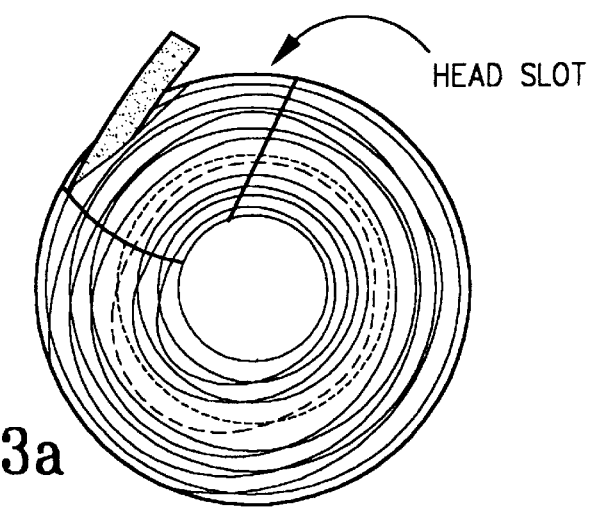
Figure 3B:
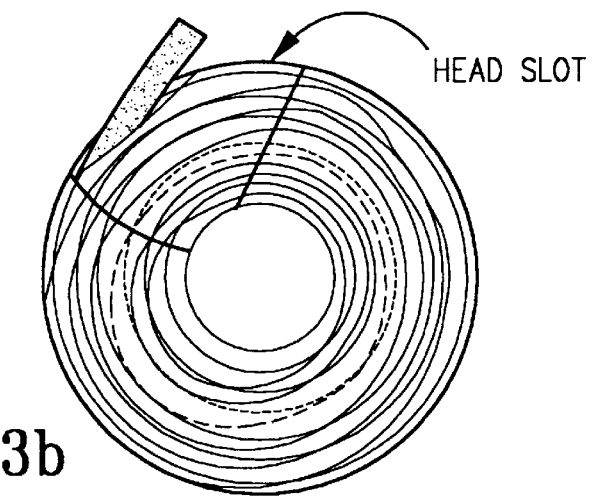
Figure 3C:
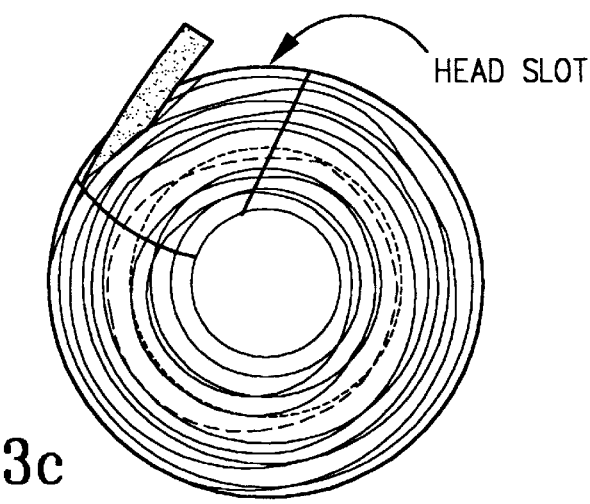

The heads used to generate the reflected patterns shown in FIGS. 3a–3c were standard 50% two-rail, taper-flat Winchester type heads 250. They were mounted on commonly used 50% Winchester suspensions 260. The tested media system 200 differed from standard 3.5 inch floppy head/disk interface because both top and bottom heads were mounted on suspensions. As noted above, the head/suspension assembly (250 and 260) was then attached to the arm of a rotary actuator 270. The rotary actuator is mounted on a stage (not shown) that provides vertical or Z axis movement to simulate misalignment between the HSA and cartridge hence changing head penetration. Head penetration is defined as the axial position difference between the static centerline of the head pair and center-plane of the disk at the hub. Head penetration is negative if the head pair centerline is lower than the center-plane of the disk.

FIGS. 2a–2d show how the disk (media 220) behaved while no external load from a head pair 250 was being applied. The disk (media 220) is indicated by the slight gray shading. The head access slot shape is outlined in the figure by the radial lines as mentioned above. The thinner circular rings are the image of the reference target reflected off the flat clear plastic top plate. Thus, the preferred reference pattern can be observed in FIGS. 2a–3c. The thicker lines are the image of the reference target reflected off the media 220. When the reflected image off the disk is not circular, a wave is then considered to exist on the disk. The peaks and valleys can be identified at the turning points of the reflected lines. To obtain actual displacement, one only need integrate the slope profile over the whole disk.

In FIGS. 3a–3c, the heads were loaded on the media 220 and with different head penetrations. In FIG. 3a, the head penetration was –300 microns, FIG. 3b, approximately 0 microns, and FIG. 3c, +300 microns. The images or reflections of the pattern shown in these figures clearly shows the displacement or alteration of the media 220 due the presence and vertical alignment of the heads 250. Thus, the system 100 and method of the present invention provides the capability to observe the displacement or alternation of a flexible media during various operating conditions.

Accordingly, this invention is not limited to the particular embodiments disclosed, but is intended to cover all modifications that are within the scope and spirit of the invention as defined by the appended claims.

What is claimed is:

1. A flexible media mode observation system for observing modes of an optically exposed rotating flexible media, the system comprising:

a transparent sheet having a reference pattern disposed thereon, said transparent sheet being located above said optically exposed rotating flexible media and said reference pattern being aligned with a center of said optically exposed rotating flexible media; and a camera located above said transparent sheet, whereby, said camera receives said reference pattern reflected off a surface of said optically exposed rotating flexible media, the received reflected reference pattern indicating the modes of said optically exposed rotating flexible media.

2. A flexible media mode observation system according to claim 1, wherein said reference pattern comprises a plurality of concentric circles having centers aligned with the center of said optically exposed rotating flexible media.

3. A flexible media mode observation system according to claim 2, wherein at least one of the plurality of concentric circles comprises a dashed line.

4. A flexible media mode observation system according to claim 1, further comprising:

a light diffuser attached to said transparent sheet and located between said transparent sheet and said camera; and a light source located between said camera and the light diffuser, the light source and light diffuser generating a uniform illumination across the surface of the flexible media and said transparent sheet.

5. A flexible media mode observation system according to claim 4, further comprising a monitor operatively coupled said camera for viewing the image reflected from the surface of the flexible media.

6. A flexible media mode observation system according to claim 5, further comprising a video cassette recorder operatively coupled to said camera for recording the image reflected from the surface of the flexible media.

7. A flexible media mode observation system according to claim 6, further comprising a video printer operatively coupled to said camera for printing the image reflected from the surface of the flexible media.

8. A flexible media mode observation system for observing modes of an optically exposed rotating flexible media, the system comprising:

a transparent sheet having a reference pattern disposed thereon, said transparent sheet being located above said optically exposed rotating flexible media and said reference pattern being aligned with a center of said optically exposed rotating flexible media, said reference pattern comprising a plurality of concentric circles having centers aligned with the center of said optically exposed rotating flexible media and at least one of the plurality of concentric circles comprising a dashed line;

a camera located above said transparent sheet, a light diffuser attached to said transparent sheet and located between said transparent sheet and said camera;

a light source located between said camera and the light diffuser, the light source and light diffuser generating a uniform illumination across the surface of the flexible media and said transparent sheet;

a monitor operatively coupled said camera for viewing the image reflected from the surface of the flexible media;

a video cassette recorder operatively coupled said camera for recording the image reflected from the surface of the flexible media; and a video printer operatively coupled said camera for printing the image reflected from the surface of the flexible media, whereby, said camera receives said reference pattern reflected off a surface of said optically exposed rotating flexible media, the received reflected reference pattern indicating the modes of said optically exposed rotating flexible media.

9. A flexible media mode observation system for observing modes of an optically exposed rotating flexible media, comprising:

an optically exposed rotating flexible media;

a transparent sheet having a reference pattern disposed thereon, said transparent sheet being located above said optically exposed rotating flexible media and said reference pattern being aligned with a center of said optically exposed rotating flexible media; and a camera located above said transparent sheet, whereby, said camera receives said reference pattern reflected off a surface of said optically exposed rotating flexible media, the received reflected reference pattern indicating the modes of said optically exposed rotating flexible media.

10. A flexible media mode observation system according to claim 9, further comprising a top and a bottom plate surrounding the flexible media, the top plate being transparent and located between the flexible media and transparent sheet.

11. A flexible media mode observation system according to claim 10, further comprising:

a pair of heads;

a rotary actuator arm; and suspensions connecting the pair of heads to the rotary actuator arm, where the combination of the heads, suspensions, and rotary actuator arm may be moved to operatively engage the flexible media.

12. A flexible media mode observation system according to claim 11, wherein said reference pattern comprises plurality of concentric circles having centers aligned with the center of said optically exposed rotating flexible media.

13. A flexible media mode observation system according to claim 12, wherein at least one of the plurality of concentric circles comprises a dashed line.

14. A flexible media mode observation system according to claim 11, further comprising:

a light diffuser attached to said transparent sheet and located between said transparent sheet and said camera; and a light source located between said camera and the light diffuser, the light source and light diffuser generating a uniform illumination across the surface of the flexible media and said transparent sheet.

15. A flexible media mode observation system according to claim 14, further comprising a monitor operatively coupled said camera for viewing the image reflected from the surface of the flexible media.

16. A flexible media mode observation system according to claim 15, further comprising a video cassette recorder operatively coupled said camera for recording the image reflected from the surface of the flexible media.

17. A flexible media mode observation system according to claim 16, further comprising a video printer operatively coupled said camera for printing the image reflected from the surface of the flexible media.

18. A flexible media mode observation system for observing modes of an optically exposed rotating flexible media, comprising:

an optically exposed rotating flexible media;

a top and a bottom plate surrounding the flexible media, the top plate being transparent and located between the flexible media and transparent sheet;

a pair of heads;

a rotary actuator arm;

suspensions connecting the pair of heads to the rotary actuator arm, where the combination of the heads, suspensions, and rotary actuator arm may be moved to operatively engage the flexible media;

a transparent sheet having a reference pattern disposed thereon, said transparent sheet being located above said optically exposed rotating flexible media and said reference pattern being aligned with a center of said optically exposed rotating flexible media, said reference pattern comprising a plurality of concentric circles having centers aligned with the center of said optically exposed rotating flexible media and at least one of the plurality of concentric circles comprising a dashed line;

a camera located above said transparent sheet, a light diffuser attached to said transparent sheet and located between said transparent sheet and said camera;

a light source located between said camera and the light diffuser, the light source and light diffuser generating a uniform illumination across the surface of the flexible media and said transparent sheet;

a monitor operatively coupled said camera for viewing the image reflected from the surface of the flexible media;

a video cassette recorder operatively coupled said camera for recording the image reflected from the surface of the flexible media; and a video printer operatively coupled said camera for printing the image reflected from the surface of the flexible media, whereby, said camera receives said reference pattern reflected off a surface of said optically exposed rotating flexible media, the received reflected reference pattern indicating the modes of said optically exposed rotating flexible media.

19. A method of observing modes of an optically exposed rotating flexible media, comprising the steps of:

placing a transparent sheet having a reference pattern disposed thereon above said optically exposed rotating flexible media;

aligning said reference pattern with a center of said optically exposed rotating flexible media; and placing a camera above said transparent sheet, whereby, said camera receives said reference pattern reflected off a surface of said optically exposed rotating flexible media, the received reflected reference pattern indicating the modes of said optically exposed rotating flexible media.

20. A method according to claim 19, wherein said reference pattern comprises a plurality of concentric circles having centers aligned with the center of said optically exposed rotating flexible media.

21. A method according to claim 20, wherein at least one of the plurality of concentric circles comprises a dashed line.

22. A method comprising the steps of:

rotating a flexible medium at a predetermined speed, the flexible medium undergoing deformation as a result of the rotation, characterized as a mode;

projecting a reference pattern onto a surface of said rotating flexible medium;

observing a reflection of said reference pattern off the surface of said rotating flexible medium, said reflection indicating the mode of said rotating flexible medium.

23. The method recited in claim 22, wherein said reference pattern comprises a plurality of concentric circles having a common center, and wherein said method further comprises the step of aligning the common center of said plurality of concentric circles of said reference pattern with a center of said rotating flexible medium.

24. The method recited in claim 23, wherein at least one of the plurality of concentric circles comprises a dashed line.

25. The method recited in claim 22, further comprising the step of obtaining an image of the reflection of said reference pattern.

26. The method recited in claim 25, further comprising the step of superimposing the image of the reflection of said reference pattern on an image of the reference pattern that was projected onto the rotating flexible medium.

27. The method recited in claim 25, further comprising the step of:
 placing a transparent sheet having said reference pattern disposed thereon above said rotating flexible medium; and
 placing a camera above said transparent medium, said camera obtaining the image of the reflection of said reference pattern.

* * * * *

UNITED STATES PATENT AND TRADEMARK OFFICE
CERTIFICATE OF CORRECTION

PATENT NO. : 5,825,409
DATED : October 20, 1998
INVENTOR(S) : Yiping Ma et al

It is certified that error appears in the above-identified patent and that said Letters Patent is hereby corrected as shown below:

Col. 4, line 41, "25" should be deleted.

Col. 6, line 27, after "coupled" insert --to--

Col. 7, line 55, after "coupled" insert --to--

Col. 7, line 59, after "coupled" insert --to--.

Signed and Sealed this

Thirtieth Day of March, 1999

Attest:

Q. TODD DICKINSON

*Attesting Officer*　　*Acting Commissioner of Patents and Trademarks*